United States Patent
Aoyama

[11] Patent Number: 6,132,015
[45] Date of Patent: Oct. 17, 2000

[54] BRAKING FORCE CONTROLLER

[75] Inventor: Yutaka Aoyama, Hadano, Japan

[73] Assignee: Nissan Motor Co., Ltd., Yokohama, Japan

[21] Appl. No.: 09/265,801

[22] Filed: Mar. 10, 1999

[30] Foreign Application Priority Data

Mar. 23, 1998 [JP] Japan ................................ 10-074308

[51] Int. Cl.$^7$ ................................ B60L 7/24; B60T 8/58
[52] U.S. Cl. ........................ 303/152; 188/156; 188/158; 303/114.1
[58] Field of Search ................................ 303/152, 20, 3, 303/114.1, 187, 9.69; 477/188; 188/156, 158, 159, 358, 359; 701/22, 71; 180/165, 65.1–65.8

[56] References Cited

U.S. PATENT DOCUMENTS

| | | | |
|---|---|---|---|
| 4,848,852 | 7/1989 | Inoue et al. | 303/152 |
| 5,433,512 | 7/1995 | Aoki et al. | 303/152 |
| 5,568,962 | 10/1996 | Enomoto et al. | 303/152 |
| 5,632,534 | 5/1997 | Knechtges | 303/152 |
| 5,707,115 | 1/1998 | Bodie et al. | 303/3 |
| 5,895,100 | 4/1999 | Ito et al. | 303/152 |
| 5,984,432 | 11/1999 | Otomo et al. | 303/152 |
| 6,021,365 | 2/2000 | Ishii et al. | 701/22 |

FOREIGN PATENT DOCUMENTS

| | | |
|---|---|---|
| 6171489 | 6/1994 | Japan . |
| 6-219259 | 8/1994 | Japan . |
| 6351104 | 12/1994 | Japan . |
| 7250401 | 9/1995 | Japan . |
| 9505299 | 2/1995 | WIPO . |

*Primary Examiner*—Douglas C. Butler
*Attorney, Agent, or Firm*—Foley & Lardner

[57] ABSTRACT

A control circuit performs regenerative co-operative control during regenerative braking so that a total braking force does not vary before and after regenerative braking. If antilock brake control is started on one of the wheels, the control circuit stops regenerative co-operative control, and gradually increases fluid pressure to the wheel cylinders of the wheels for which antilock brake control is not carried out.

5 Claims, 5 Drawing Sheets

BRAKING FORCE CONTROLLER

FIELD OF THE INVENTION

The present invention relates to a braking force controller used for a hybrid vehicle or an electric vehicle.

BACKGROUND OF THE INVENTION

In addition to a hydraulic braking system, some hybrid vehicles and electric vehicles with a motor-generator are also equipped with a regenerative braking system. The regenerative braking system uses a motor-generator as a generator when a driver releases his foot from an accelerator pedal or when a brake pedal is depressed, and decelerates a vehicle by transforming kinetic energy into electrical energy (regenerative braking). The electrical power which is then generated is stored in a battery or capacitor. Tokkai Hei 6-219259 published by the Japanese Patent Office in 1994 disloses an electric vehicle equipped with such a regenerative braking system.

While the motor-generator is functioning as a generator, the braking force due to the hydraulic pressure brake is reduced according to the magnitude of the regenerative braking force, i.e., the amount of power generated by the motor-generator. It is therefore ensured that the total braking force does not vary before and after regenerative braking. This is known as regeneration co-operative control.

SUMMARY OF THE INVENTION

Some of these vehicles are fitted with an antilock brake control system so that the wheels do not lock even if the brake is suddenly applied on an icy road or another slippery road.

To increase the controllability of antilock brake control in such vehicles, it is desirable to stop the above-mentioned regenerative braking during antilock brake control, and perform braking only with a hydraulic pressure brake.

Under the regenerative co-operative control, the hydraulic pressure braking force is low due to co-operation with the regenerative braking when antilock brake control is invoked. Therefore, the fluid pressure of the hydraulic pressure brake should be increased simultaneously with the start of antilock brake control so as to compensate the lack of the regenerative braking force when the regenerative braking is stopped.

However, while the fluid pressure of the hydraulic pressure brake instantaneously increases, the regenerative braking force of the motor-generator does not become zero immediately, so the fluid pressure of the hydraulic pressure brake becomes to excess temporarily and the total braking force increases.

Consequently, the fluid pressure of the hydraulic pressure brake increases too far with wheels other than those for which fluid pressure is limited or decreased by antilock brake control. As the wheels easily tend to lock, and antilock brake control may be performed too early. This problem is especially serious when fluid pressure is increased and decreased for all cylinders of the four wheels together upstream of the antilock brake control circuit.

It is therefore an object of this invention to prevent the fluid pressure of a hydraulic brake for wheels other than those under antilock brake control, from excessively increasing when regenerative braking is interrupted during antilock control.

In order to achieve the above object, this invention provides a braking force controller for a vehicle with wheels, comprising a generator which applies an electrical braking force to one of the wheels, hydraulic actuators which respectively apply braking force to all of the wheels, a fluid pressure control circuit which provides a first fluid pressure, a brake control circuit which provides a second pressure based on the first pressure to the actuators, an antilock brake control circuit which provides a third pressure which is lower than the second fluid pressure to an actuator corresponding to a slipping wheel. The controller further comprises a microprocessor programmed to control the fluid pressure control circuit to decrease the first fluid pressure when the generator is applying the electrical braking force to the one of the wheels, control the generator to stop application of the electrical braking force to one of the wheels and control the fluid pressure control circuit to increase the first fluid pressure, when the antilock brake control circuit is providing the third fluid pressure to the actuator corresponding to the slipping wheel, control the brake control circuit to increase the second fluid pressure more gradually than the increase of the first fluid pressure by the fluid pressure control circuit, when the motor generator has stopped application of the electrical braking force to one of the wheels.

The details as well as other features and advantages of this invention are set forth in the remainder of the specification and are shown in the accompanying drawings.

DESCRIPTION OF THE PREFERRED EMBODIMENTS

Figure 1:
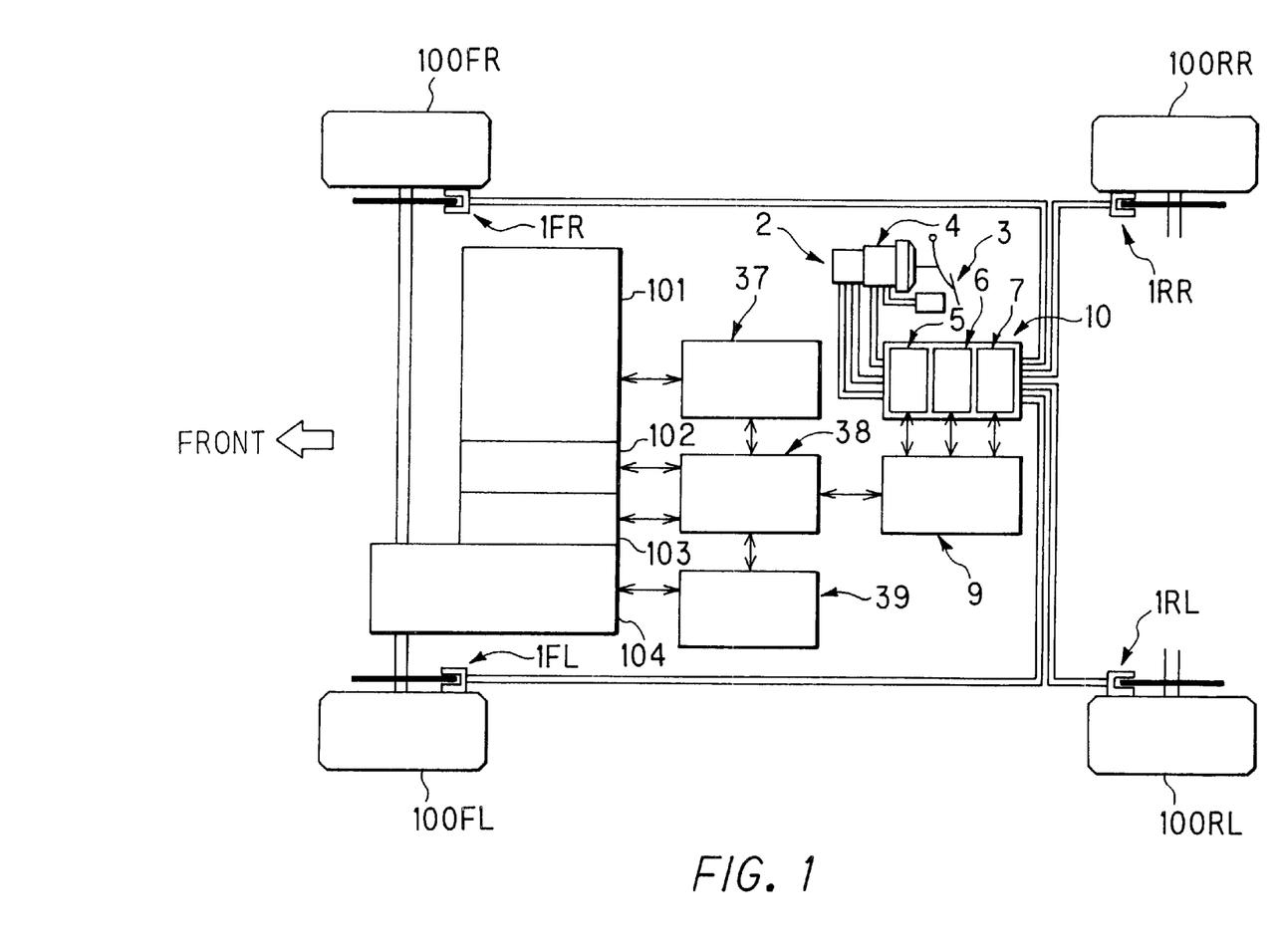
FIG. 1 is a schematic diagram of a vehicle braking force controller according to this invention.

Referring to FIG. 1 of the drawings, a parallel hybrid vehicle is equipped with an internal combustion engine 101 and a three-phase inductance motor-generator 103 as a source of drive force.

The engine 101 is connected to a continuously variable transmission (CVT) 104 via an electromagnetic powder clutch 102. The motor-generator 103 is interposed between the clutch 102 and CVT 104. The output shaft of the CVT 104 is connected to front wheels 100FL, 100FR which are the drive wheels.

The front wheels 100FL, 100FR may be driven by the engine 101 or by the motor-generator 103. Conversely, if the motor-generator 102 is used as a generator, a regenerative braking force acts on the front wheels 100FL, 100FR. The electrical power generated by the motor-generator 103 charges a battery, not illustrated.

A clutch 102 is tightened when the torque of the engine 101 is transferred to the drive system. When the torque of the engine 101 is not required, the engine 101 is stopped, and the clutch 102 is released.

The engine 101 is controlled by an engine controller 37 which comprises a microprocessor. An intake amount, throttle opening, oxygen concentration of the exhaust, coolant temperature, vehicle speed, engine rotation speed and engine rotation phase signal are input to the engine controller 37.

The engine controller 37 performs predetermined operations using these signals. It outputs an intake amount control signal to a throttle actuator in an intake pipe, an air-fuel control signal to an injector, and an ignition timing control signal to a distributor. The engine controller 37 also drives the engine 101 according to a signal which commands engine startup and stop from a motor-generator controller 38, described hereafter.

The clutch 102 and the motor-generator 103 are controlled by the motor-generator controller 38. The CVT 104 is controlled by a CVT controller 39. The controllers 38 and 39 also comprise microprocessors. They communicate with the engine controller 37 and a brake controller 9 described hereafter.

A selector lever position, an accelerator pedal depression amount, a brake pedal depression amount, the input rotation speed and output rotation speed of the CVT 104 and other signals are input into the CVT controller 39. The CVT controller 39 performs predetermined operations using these signals. It outputs a speed ratio control signal, and a fluid pressure control signal and a line pressure control signal to a fluid pressure control valve.

The CVT controller 39 performs speed ratio control so that a speed ratio calculated from the input rotation speed and output rotation speed of the CVT 104 coincides with a target speed ratio set based on for example vehicle speed, input rotation speed and accelerator pedal depression amount. Herein, the speed ratio is a value obtained by dividing the input rotation speed by the output rotation speed of the CVT 104. The target speed ratio is for example based on a predetermined map. It is set to become larger the lower the vehicle speed, the more the accelerator pedal depression amount increases, and the more the input rotation speed increases.

The vehicle speed, accelerator pedal depression amount, a charge state of a battery, a battery temperature, and the input rotation speed and other signals are input to the motor-generator controller 38. The motor-generator controller 38 performs predetermined operations using these signals. It outputs a clutch control signal which controls the clutch 102, and outputs a motor-generator control signal to an inverter, not shown, which drives the motor-generator 103. The inverter controls the direction and magnitude of the supply current to the motor-generator 103 according to this control signal.

Moreover the motor-generator controller 38 determines, by looking up a predetermined map, whether the present running state of the vehicle is in a motor running region, engine running region or hybrid running region, when it is determined that the accelerator pedal is depressed. Herein, the motor running region is a region in which the vehicle runs only on the power of the motor-generator 103, the engine running region is a region in which the vehicle runs only under the power of the engine 101, and the hybrid running region is a region shared by the engine 101 and motor-generator 103 during acceleration. The motor-generator controller 38 also controls the motor-generator 103 and the clutch 102 according to the determined running region, and outputs a command signal to the engine controller 37.

On the other hand, when it is determined that the accelerator pedal is released, if the vehicle speed is zero, the motor-generator controller 38 determines that the vehicle has stopped, and releases the clutch 102.

If the vehicle speed is not zero and antilock brake control is not performed by the brake controller 9 described hereafter, the motor-generator controller 38 computes a target power generation amount according to the vehicle speed, selector lever position and other signals by looking up a predetermined map. The motor-generator 103 is caused to generate power according to this target power generation amount. The electrical power is stored in a battery, not illustrated. The motor-generator controller 38 notifies the computed target power generation amount as a value showing the magnitude of a regenerative braking force to the brake controller 9.

When antilock brake control is performed by the brake controller 9, the motor-generator controller 38 stops regenerative braking by the motor-generator 103 and sets a regenerative co-operative control stop flag $F_{REG\text{-}STP}$, described later. When regenerative braking is completely stopped, this flag is reset.

Wheel cylinders 1FL-1RR for braking are attached to wheels 100FL-100FR, respectively. A brake actuator control circuit 10 for controlling the fluid pressure to the wheel cylinders 1FL-1RR is provided between the wheel cylinders 1FL-1RR and pressure sources (master cylinder 2 and booster 4). The master cylinder 2 and the booster 4 increase the fluid pressure according to the depression amount of a brake pedal 3. The brake actuator control circuit 10 will be described in detail hereafter. The brake actuator control circuit 10 is controlled by the brake controller 9 which comprises a microprocessor. The brake controller 9 performs fluid pressure control and therefore exchanges data with the engine controller 37, motor-generator controller 38 and CVT controller 39.

Figure 2:
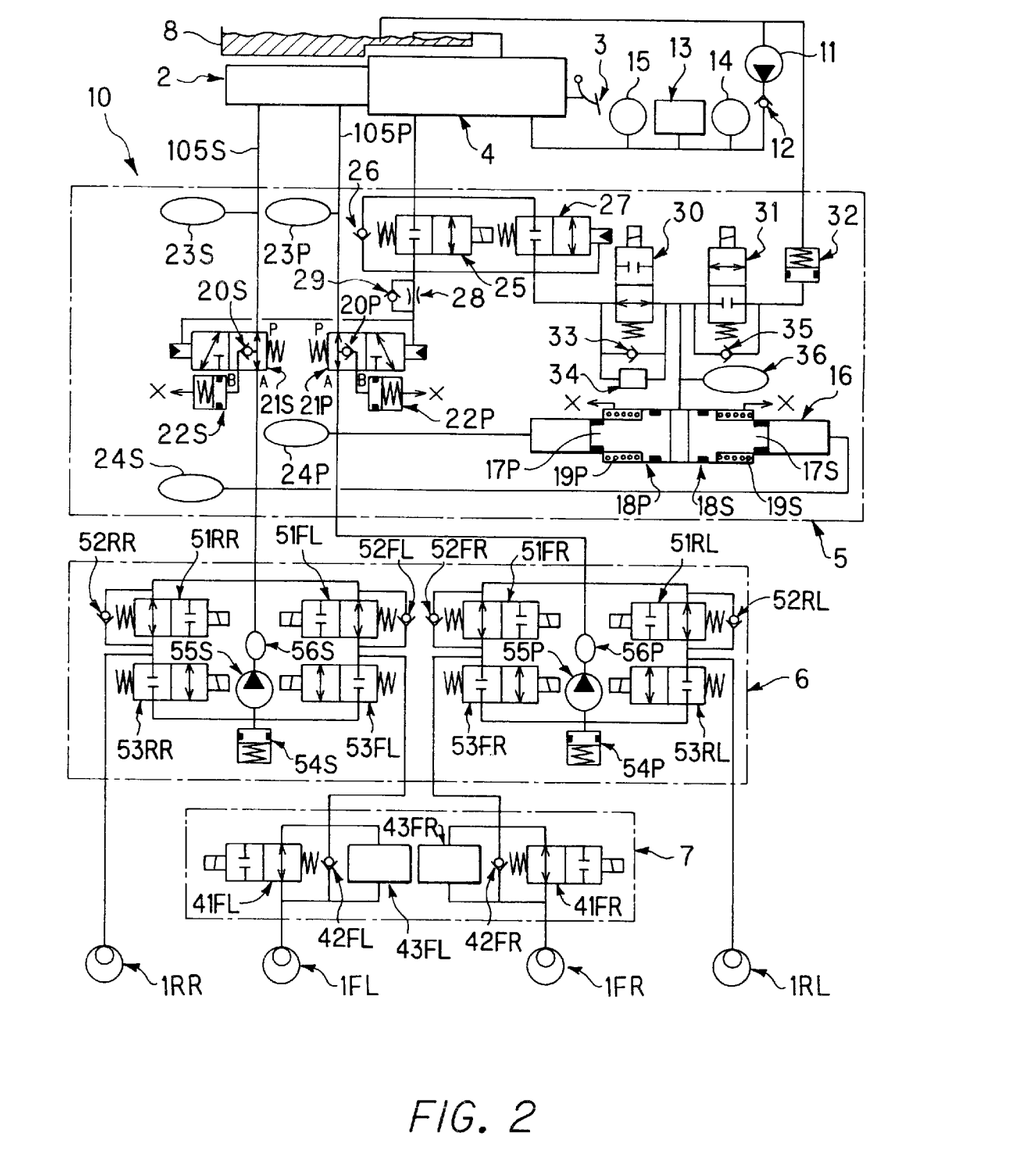
FIG. 2 is a circuit diagram of a brake actuator control circuit according to this invention.

Next, the brake actuator control circuit 10 will be described referring FIG. 2.

The brake actuator control circuit 10 comprises a four-wheel general control circuit 5, an antilock brake control circuit 6 and a front wheel control circuit 7.

The four-wheel general control circuit 5 increases and decreases fluid pressure to the brake cylinders of all four wheels separately from the master cylinder 2. The antilock brake control circuit 6 prevents the wheels from locking so as to achieve a shorter brake stopping distance as well as to stabilize the steering. The front wheel control circuit 7 decreases the fluid pressure to the front wheels 100FR, 100FL under predetermined conditions.

Figure 5:
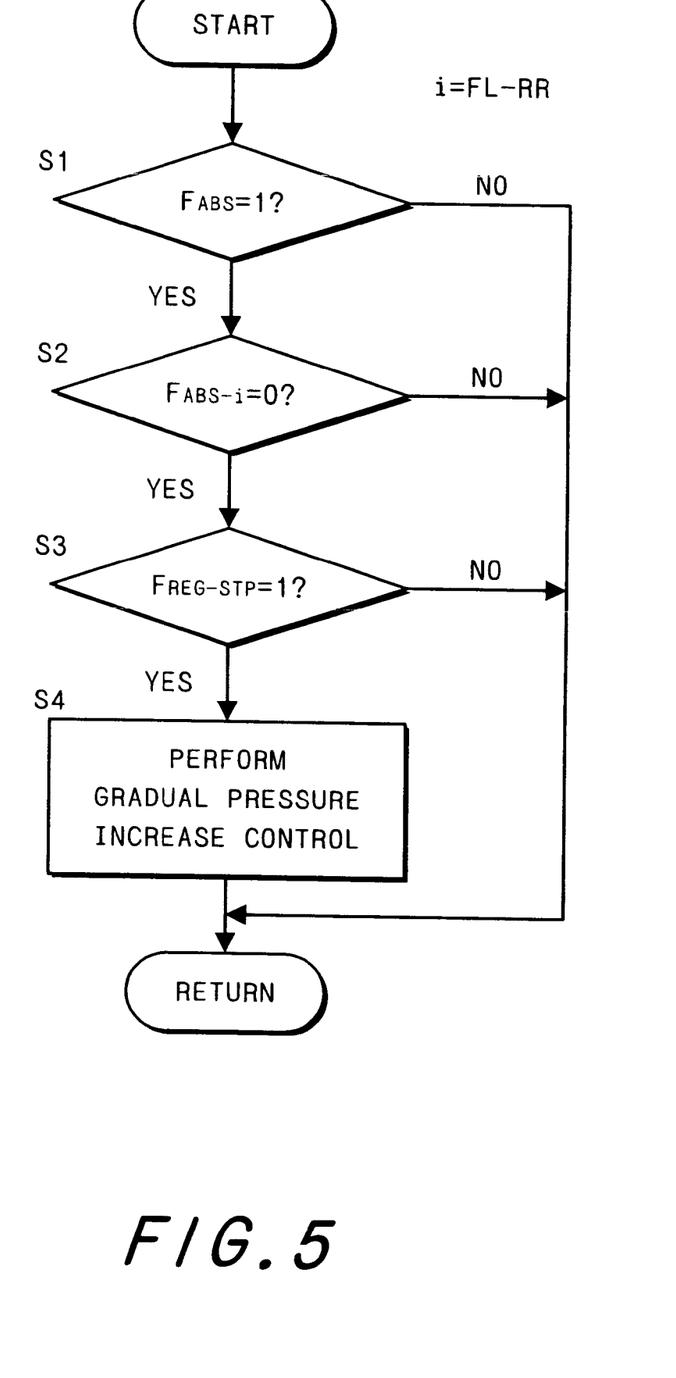
FIG. 5 is a flowchart showing a computing process performed by the braking force controller.

The master cylinder 2 outputs a fluid pressure according to the depression amount of the brake pedal 3 to two lines 105P, 105S. The two lines 105P, 105S from the master cylinder 2 are in a so-called X-line arrangement (FIG. 5). That is, the front right wheel cylinder 1FR and rear left wheel cylinder 1RL are connected to the line 105P, and the front left wheel cylinder 1FL and rear right wheel cylinder 1RR are connected to the line 105S. Due to the X-line arrangement, even if an abnormality should arise in one line, it is possible to balance the braking force between the front and rear, and between the left and right of the vehicle using the remaining line, thereby ensuring vehicle stability. The booster 4 is provided between the brake pedal 3 and the master cylinder 2. The booster 4 will be described later.

The structure of the pressure control valve in the antilock brake control circuit 6 is the same as that in the conventional recirculation type. The primary line 105P from the master cylinder 2 branches into two parts, and the secondary line 105S also branches into two parts. The wheel cylinders 1FL-1RR are connected to the ends of these branches via pressure increase control valves 51FL-51RR.

The pressure increase control valves 51FL-51RR are two-position change-over solenoid valves, and are normally opened. Check valves 52FL-52RR which permit only recirculation of the fluid to the master cylinder 2 from the wheel cylinders 1FL-1RR are respectively connected to the pressure increase control valves 51FL-51RR in parallel.

Pressure decrease control valves 53FL-53RR are also connected downstream of the pressure increase control valves 51FL-51RR. The pressure decrease control valves 53FL-53RR are two-position change-over solenoid valves which are normally closed. The outputs of the pressure decrease control valves 53FL-53RR are connected to reservoirs 54P, 54S and pumps 55P, 55S. The discharge ports of the pumps 55P, 55S are connected to the lines 105P, 105S via dampers 56P, 56S. The fluid pressures of the wheel cylinders 1FL-1RR are thereby recirculated to the lines 105P, 105S via the pressure decrease control valves 53FL-53RR, pumps 55P, 55S and dampers 56P, 56S.

The antilock brake control circuit 6 is normally controlled according to a computing process executed in the brake controller 9 based on wheel speed signals from wheel speed sensors provided on each wheel and other signals. That is, it monitors the relation of the wheel speeds to the vehicle speed. When a wheel having a slip rate greater than a predetermined value starts to lock, the pressure increase control valve 51FL-51RR of the wheel is closed, and the fluid pressure of the wheel cylinder 1FL-1RR for the wheel is retained. If the lock state of the wheel does not recover, the pressure decrease control valve 53FL-53RR of the wheel is opened while operating the pump 55P, 55S, and the fluid pressure of the wheel cylinder 1FL-1RR is reduced by recirculating to the master cylinder 2.

When the wheel speed has recovered due to this operation, the pressure decrease control valve 53FL-53RR is temporarily closed to retain the fluid pressure of the wheel cylinder 1FL-1RR. Subsequently, the pressure increase control valve 51FL-51RR is opened at a predetermined time for a predetermined interval so as to gradually increase the fluid pressure of the wheel cylinder 1FL-1RR of the wheel.

By repeating this sequence of operations, the vehicle can be decelerated without fail while achieving braking distance reduction as well as ensuring steering control.

The control applied to other wheel cylinders not under antilock control when the motor-generator performs regenerative braking and antilock brake control is started on one of the wheel cylinders will be described hereafter.

According to this embodiment, the front wheel control circuit 7 is provided between the pressure increase control valves 51FL, 51FR, and the wheel cylinders 1FL, 1FR of the front wheels. The front wheel control circuit 7 comprises change-over valves 41FL, 41FR, check valves 42FL, 42FR, and proportioning valves 43FL, 43FR.

The change-over valves 41FL, 41FR are two-position change-over solenoid valves which are normally open, and are interposed between the pressure increase control valves 51FL, 51FR and the wheel cylinders of the front wheels 1FL, 1FR. The check valves 42FL, 42FR are connected to the change-over valves 41FL, 41FR in parallel. This permits only recirculation from the wheel cylinders 1FL, 1FR to the master cylinder 2. The proportioning valves 43FL, 43FR are connected to the check valves 42FL, 42FR in parallel. The fluid pressure supplied to the wheel cylinders 1FL, 1FR can thus be decreased.

When the output pressure of the proportioning valves 43FL, 43FR is lower than the input pressure on the side of the master cylinder 2, it is gradually increased at a rate lower than the increase rate of the input pressure. When the input pressure becomes greater than a predetermined value, it is increased at the same rate as the input pressure.

The front wheel control circuit 7 is controlled according to the computing process performed by the brake controller 9. When the motor-generator 103 performs regenerative braking, the change-over valves 41FL, 41FR are closed. The fluid pressure of the wheel cylinders 1FL, 1FR is decreased to less than the supply pressure on the side of the master cylinder 2 by the proportioning valves 43FL, 43FR.

As already stated, this vehicle is a front wheel drive vehicle, and not only the engine 101 but also the motor-generator 103 is connected only to the front wheels 100FL, 100FR. The regenerative braking force due to the motor-generator 103 acts only on the front wheels 100FL, 100FR. Therefore, the fluid pressure of the wheel cylinders 1FL, 1FR should be reduced by the amount of this regenerative braking force.

When a regenerative braking force is applied only to the front wheels, the braking force of the front wheels becomes larger than the braking force of the rear wheels if the fluid pressures of all the wheel cylinders are simultaneously lowered. This may for example cause antilock brake control to be started early.

Hence, the fluid pressure of the front wheel cylinders 1FL, 1FR is decreased by the proportioning valves 43FL, 43FR by the amount of the regenerative braking force. Herein, the regenerative braking force due to the motor-generator 103 varies depending on the vehicle speed. Therefore, the fluid pressure is reduced by the proportioning valves 43FL, 43FR for example by the amount of a relatively stable but small regenerative braking force which might occur at medium and high speed.

Figures 3, 4:
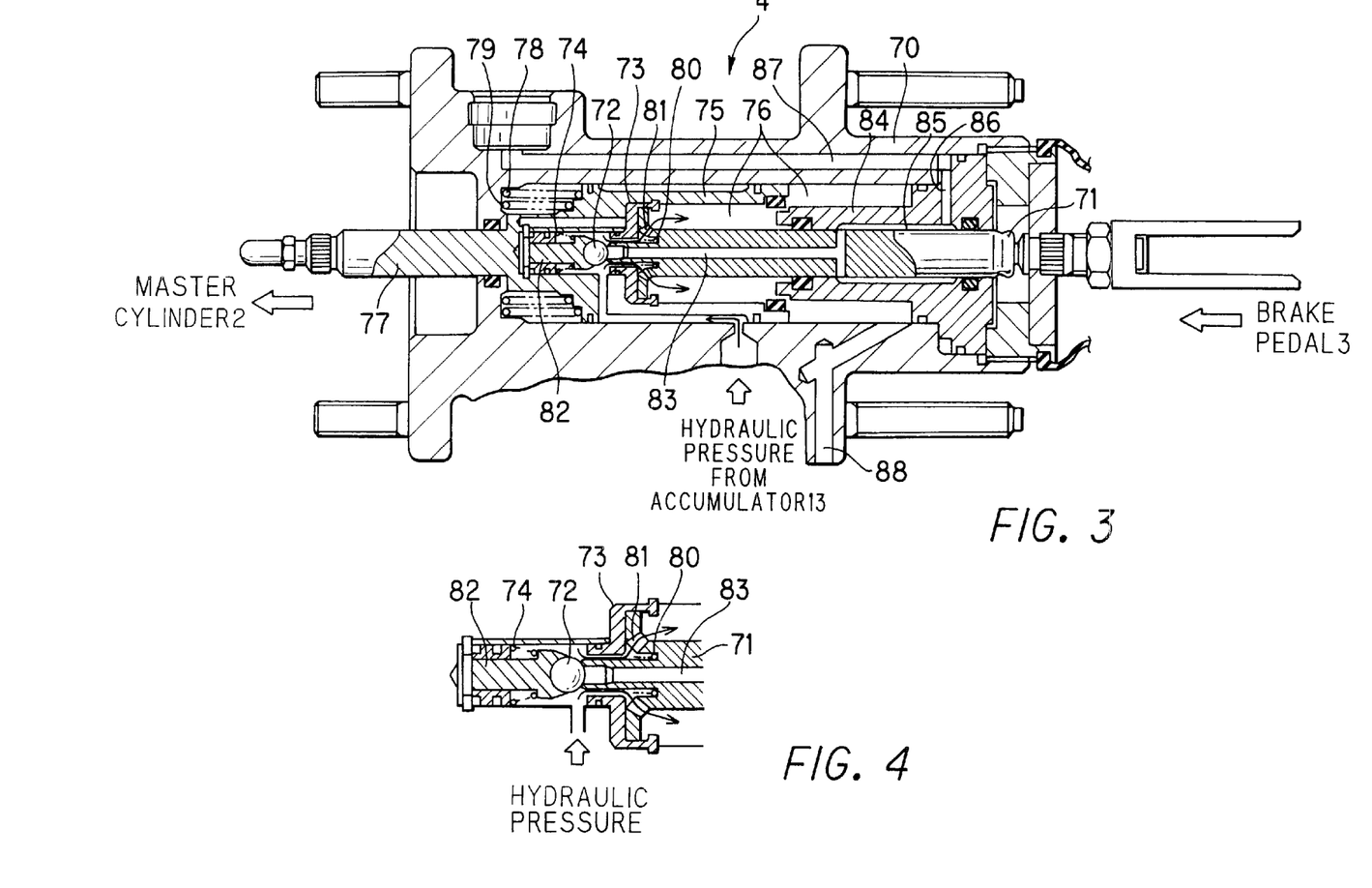
FIG. 3 is a longitudinal sectional view of a booster according to this invention.
FIG. 4 is a partial enlarged longitudinal sectional view of the booster.

Next, the booster 4 and the fluid pressure source for the booster 4 will be described.

In a hybrid vehicle such as described in this embodiment, the engine 101 often stops, so an electric pump 11 is used as a fluid pressure source for the booster 4. Fluid in the main reservoir 8 is aspirated by the electric pump 11, and is discharged via a check valve 12. An accumulator 13 is connected between the discharge port of the electric pump 11 and the inlet port of the booster 4.

Pressure switches 14 and 15 are provided respectively upstream and downstream of the accumulator 13. The electric pump 11 operates whichever pressure, i.e., the pressure upstream or downstream of the accumulator 13, falls below the predetermined value, so the fluid pressure in the accumulator 13, i.e., the supply fluid pressure to the booster 4, is maintained greater than a predetermined value.

FIG. 3 and FIG. 4 show the booster 4 in the state where the brake pedal 3 was depressed.

When the brake pedal 3 is not depressed, an input shaft 71 retreats toward the right of the diagram. This causes a steel ball 72 to be pushed against a valve seat 73 by a spring 74. The fluid pressure from the accumulator 13 which is taken in from the outer circumference of a piston 75 does not flow into a cylinder chamber 76 in the piston 75, hence no force is generated to suppress the piston 75. The cylinder chamber 76 is also connected to the inside of a booster body 70. A rod 77 connected to the master cylinder 2 extends from the piston 75. When the brake pedal 3 is not depressed, return springs 78, 79 cause the piston 75 and rod 77 to retreat toward the right of the diagram.

If the brake pedal 3 is then depressed, the input shaft 71 moves toward the left of the diagram in opposition to a spring 80 interposed between the input shaft 71 and the valve seat 73. When the tip of the input shaft 71 moves the steel ball 72 toward the left of the diagram together with a holder 82 against the elastic force of the spring 74, the steel ball 72 separates from the valve seat 73. As a result, fluid flows into the cylinder chamber 76 of the piston 75 from the accumulator 13 via a port 81 formed in the input shaft 71 from the gap between the input shaft 71 and valve seat 73, and this pushes the piston 75 toward the left of the diagram together with valve seat 73. The rod 77 moves toward the master cylinder 2, and the fluid pressure in the master cylinder 2 increases.

The piston 75 may also be pushed toward the left of the diagram with the valve seat 73 by the input shaft 71, but the piston 75 is always pushed first by the fluid pressure. Therefore, even if the depression force of the brake pedal 3 is small, the rod 77 is pushed strongly. The fluid pressure in the master cylinder 2 is thereby boosted.

When the depression of the brake pedal 3 is stopped in the state where the brake pedal 3 was depressed to some extent, a valve seat 73 and the input shaft 71 separate due to the elastic force of the spring 80. The input shaft 71 retreats toward the right of the diagram relative to the valve seat 73. However, the input shaft 71 comes in contact with the steel ball 72, therefore, the steel ball 72 is again pushed against the valve seat 73 due to the elastic force of the spring 74. This closes the gap between the two, and seals the fluid pressure inside the cylinder chamber 76. Due to this sealed pressure, an auxiliary pressure is obtained which maintains the piston 75 and the rod 77 in a state where they are displaced toward the master cylinder 2.

When, on the other hand, the driver releases his foot from the brake pedal 3, the input shaft 71 which became free retreats to the right of the diagram due to the spring 80. The steel ball 72 and input shaft 71 then separate while the steel ball 72 remains in contact with the valve seat 73. When this occurs, the fluid pressure in the cylinder chamber 75 is recirculated to the main reservoir 8 from the clearance between the input shaft 71 and the valve seat 73 via a passage 83 formed from the tip of the input shaft 71, and a passages 85, 86 formed in an input shaft guide 84, and a passage 87 formed in the booster body 70.

Hence in the booster 4, fluid pressure from the accumulator 13 always flows into the cylinder chamber 76 after the brake pedal 3 starts to be depressed, and it increases the pressure. A passage 88 is therefore formed in the valve body 70. The fluid pressure in the chamber 76 increases the pressure in conjunction with the depression of the brake pedal 3, and is extracted as a fluid pressure from a fluid pressure source which differs from the master cylinder 2. The fluid pressure thus extracted is supplied to the four-wheel general control circuit 5 described later, and is used at the time of regenerative braking.

Next, the structure of the four-wheel general control circuit 5 will be described referring again to FIG. 2.

Regenerative brake change-over valves 21P, 21S which are two-position change-over pilot valves that use the fluid pressure extracted from the booster 4 as a pilot pressure, are interposed in the lines 105P, 105S from the master cylinder 2.

Ports P of the regenerative brake change-over valves 21P, 21S are connected to the lines 105P, 105S. Port A in the regenerative brake change-over valves 21P, 21S are connected to the pressure increase control valves 51FL-51RR. Ports B in the regenerative brake change-over valves 21P, 21S are connected to stroke simulators 22P, 22S which are a type of accumulator.

The regenerative brake change-over valves 21P, 21S connect the ports P with the ports A in the normal state when there is no pilot pressure and recirculation is permitted only from ports B to ports P or ports A due to the check valves 20P, 20S. Also, ports A are shut off, and ports P and ports B are connected, when the regenerative brake change-over valves 21P, 21S are changed-over from the normal state by the pilot pressure.

The return springs of the stroke simulators 22P, 22S have an elastic coefficient equivalent to the reaction of the fluid pressure generated in the booster 4 or master cylinder 2, and excess fluid is returned to the main reservoir 8. Pressure sensors 23P, 23S and pressure sensors 24P, 24S are provided respectively upstream and downstream of the regenerative brake change-over valves 21P, 21S.

The fluid pressure from the booster 4 is supplied as the pilot pressure of the regenerative brake change-over valves 21P, 21S via the failsafe valve 25 which is a two-position change-over valve that is normally closed.

The check valve 26 which permits only recirculation to the booster 4, and the bypass valve 27 which is a two-position change-over pilot valve that is normally closed, are connected to the failsafe valve 25 in parallel. The downstream pressure of the failsafe valve 25 or the downstream pressure of the bypass valve 27 itself is used as the pilot pressure of the bypass valve 27.

Therefore, when the failsafe valve 25 opens, its downstream pressure, i.e., the pilot pressure of the bypass valve 27, increases, and the bypass valve 27 also opens. When the failsafe valve 25 is closed when the fluid pressure from the booster 4 is low, its downstream pressure, i.e., the pilot pressure of the bypass valve 27, decreases, so the bypass valve 27 also closes.

An orifice 28 is formed between the failsafe valve 25 and the regenerative brake change-over valves 21P, 21S. A check valve 29 which permits only inflow to the pilot pressure of the regenerative brake change-over valves 21P and 21S is connected to the orifice 28 in parallel. These orifices 28 and check valves 29 may be respectively provided for the regenerative brake change-over valves 21P, 21S.

Moreover, a pressure increase control valve 30 which is a two-position change-over solenoid valve that is normally open, a pressure decrease control valve 31 which is a two-position change-over solenoid valve that is normally closed, and a reservoir 32 are connected downstream of the failsafe valve 25 or downstream of the bypass valve 27 in series. The return flow from the reservoir 32 is recirculated to the main reservoir 8.

The part between the pressure increase control valve 30 and the pressure decrease control valve 31 is connected to the inlet port of the pressure control cylinder 16. A check valve 33 which permits only recirculation from the pressure control cylinder 16, and a relief valve 34 which relieves the upstream fluid pressure of the pressure increase control valve 30 above a predetermined pressure, are connected to the pressure increase control valve 30 in parallel.

A check valve 35 which permits only recirculation from the reservoir 32 is connected to the pressure decrease control valve 31 in parallel. Moreover, a pressure sensor 36 for detecting the input fluid pressure of the pressure control cylinder 16 is attached if necessary.

The pressure control cylinder 16 is provided facing the cylinders 18P, 18S which house pistons 17P, 17S of the same shape in one cylinder body. The pistons 17P, 17S have at least the same input pressure receiving surface area and the same output pressure receiving surface area.

The output ports of the cylinders 18P, 18S are respectively connected to the lines 105P, 105S downstream of the regenerative brake change-over valves 21P, 21S. The return springs 19P, 19S of the cylinders 18P, 18S have the same elastic coefficient and an identical specification. Therefore, the same fluid pressure can be provided to the lines 105P, 105S from the two cylinders 18P, 18S.

Also, the pressure receiving surface area ratio of the input pressure receiving surface area to the output pressure receiving surface area of the pistons 17P, 17S is identical or effectively identical to the ratio of the output pressure of the master cylinder 2 to the fluid pressure from the booster 4.

The four-wheel general control circuit 5 is controlled according to a computing process performed in the brake controller 9.

If no abnormalities are detected, the failsafe valve 25 is opened. If the brake pedal 3 is depressed when antilock brake control is not performed, the fluid pressure from the booster 4 increases. Therefore, the bypass valve 27, which takes the pressure downstream of the failsafe valve 25 as a pilot pressure, changes over from the normal state and opens.

The pressure downstream of this failsafe valve 25 is also supplied as a pilot pressure to the regenerative brake change-over valves 21P, 21S via the check valve 29, and the regenerative brake change-over valves 21P, 21S are changed over. This cuts off the downstream wheel cylinders 1FL-1RR.

The lines 105P, 105S are connected to the stroke simulators 22P, 22S, therefore the fluid pressures of the lines 105P, 105S operate the pistons in the stroke simulators 22P, 22S. A return spring generates a reaction force equivalent to that in the master cylinder 2 or the booster 4, so the driver does not experience an uncomfortable sensation when the brake pedal 3 is depressed.

On the other hand, the regenerative braking force which acts on the front wheels 100FR, 100FL due to the motor-generator is computed from the vehicle speed or the speed ratio, and the braking force is computed for the case where the fluid pressure detected by the pressure sensors 23P, 23S is supplied to the wheel cylinders 1FL-1RR without modification. The output pressure of the pressure control cylinder 16 is controlled so that a value obtained by deducting the regenerative braking force and the braking force depending on the fluid pressure detected by the pressure sensors 24P, 24S coincide.

Here, the pressure control cylinder 16 can supply the same fluid pressure to the two lines 105P, 105S. Therefore, if the input pressure to the pressure control cylinder 16 increases or decreases, these pressures will fluctuate in a similar way.

Now, the ratio of the output pressure and input pressure of the pressure control cylinder 16 is the reciprocal of the ratio of pressure receiving surface areas of the pistons 17P, 17S of the two cylinders 18P, 18S. Hence, the desired fluid pressure, i.e., the increase and decrease of input pressure relative to the increase and decrease of output pressure, is set. The pressure increase control valve 30 and the pressure decrease control valve 31 are opened and closed depending on this fluctuation of input pressure.

PWM (Pulse Width Modulation) using the duty ratio may for example be applied to the increase and decrease of input pressure to this pressure control cylinder 16. A fluid pressure decreased by the pressure decrease control valve 31 is stored by the reservoir 32.

Here, the regenerative brake change-over valves 21P, 21S may also be driven by solenoids. However, in such a case, corresponding electrical circuit is required. Further, when the regenerative braking time becomes long, a problem may occur in that the excitation time of a solenoid becomes long, heat losses increase and energy losses increase.

On the other hand, according to this embodiment, the regenerative brake change-over valves 21P, 21S are driven by using the fluid pressure which is always generated in the booster 4 as a pilot pressure during depression of the brake pedal 3. The structure is therefore simplified, and excessive thermal or energy losses are prevented.

When the brake pedal 3 is depressed during regenerative braking, the brake pedal 3 returns only slightly. Even if the fluid pressure from the booster 4 tends to decline, the pilot pressure of the regenerative brake change-over valves 21P, 21S only gradually decreases through the orifice 28. Therefore, incorrect return of the regenerative brake change-over valves 21P, 21S to the normal position is prevented, and regenerative co-operative control can be continued.

Also, when the brake pedal 3 is depressed, the fluid pressure from the booster 4 flows from the check valve 29 as a pilot pressure of the regenerative brake change-over valves 21P, 21S without passing via the orifice 28, and the required response can therefore be ensured.

Moreover, when the foot is released from the brake pedal 3, the fluid pressure from the booster 4 decreases. Therefore, the pilot pressure of the regenerative brake change-over valves 21P, 21S also falls off slowly via the orifice 28. When the regenerative brake change-over valves 21P, 21S return to the normal position, the master cylinder 2 is again connected to the wheel cylinders 1FL-1RR. The fluid in the reservoir 32 passes through the check valve 35, and is recirculated through the check valve 33 and the check valve 26 to the booster 4 together with the fluid in the pressure control cylinder 16.

When an abnormality is detected in the state where the brake pedal 3 is not depressed, the failsafe valve 25 is closed. If the brake pedal 3 is then depressed, the bypass valve 27 remains closed, so fluid pressure in the booster 4 is not supplied further downstream. The regenerative brake change-over valves 21P, 21S maintain the master cylinder 2 and wheel cylinders 1FL-1RR in the connected state, thereby providing a failsafe function.

On the other hand, when an abnormality is detected where the brake pedal 3 is depressed, the failsafe valve 25 is closed immediately. Although the failsafe valve 25 closes, the downstream pressure of the failsafe valve 25, i.e., the fluid pressure on the side of the booster 4 of the check valve 26, is high. Therefore, the pilot pressure of the regenerative brake change-over valves 21P, 21S is sealed off, and the fluid pressure does not decrease. The regenerative brake change-over valves 21P, 21S continue to block the lines 105P, 105S from the master cylinder 2.

The pilot pressure of the regenerative brake change-over valves 21P, 21S which is sealed off, i.e., the downstream pressure of the failsafe valve 25, acts as a pilot pressure of the bypass valve 27, hence the bypass valve 27 remains open.

Therefore, the pressure increase control valve 30 remains open, and the pressure decrease control valve 31 remains closed.

As a result, the fluid pressure extracted from the booster 4 continues to be supplied to the lines 105P, 105S via the pressure control cylinder 16. Braking due to the fluid pressure continues at least until the foot is released from the brake pedal 3.

The pressure receiving surface area ratio between the two pistons 17P, 17S is set as the ratio of the output pressure from the master cylinder 2 and the fluid pressure extracted from the booster 4. Therefore, the fluid pressure from the pressure control cylinder 16 obtained at this time becomes equivalent to the pressure from the master cylinder 2, braking force is stabilized, and the driver does not experience an uncomfortable feeling. Moreover, the fluid pressure from the pressure control cylinder 16 becomes equivalent to the pressure from the master cylinder 2, the control circuit 6, 7 downstream of the four-wheel general control circuit 5 can be made common to the fluid pressure control cylinder 16 and master cylinder 2.

Next, referring to FIG. 5, the control which the brake controller 9 performs on wheel cylinders of wheels for which antilock brake control is not performed when antilock brake control is started during regenerative braking, will be described.

This computing process is a minor program performed on wheel cylinders of wheels for which antilock brake control has not started, when regenerative braking by the motor-generator 103 is interrupted when antilock brake control is started on one of the wheels according to a main program, not shown.

Once started, this process is performed by a timer interrupt at a predetermined sampling time $\Delta T$ until the pressure in the wheel cylinder coincides with the pressure from the master cylinder.

In this computing process, no step is provided for communication. Various information set in this computing process is stored in a memory, and required programs and maps are read from the memory.

Now, describing the flags used in the computing process, a flag $F_{ABS}$ is an antilock brake control flag. It is set to "1" when antilock brake control is started on the wheel cylinder of one of the wheels, and is reset to "0" when antilock brake control has finally terminated.

A flag $F_{ABS-i}$ (i=FL-RR) is an antilock brake control flag for each wheel. It is set to "1" when antilock brake control on a wheel cylinder $1i$ (i=FL-RR) of a wheel $100i$ (i=FL-RR) is started, and is reset to "0" when antilock brake control has finally terminated.

A flag $F_{REG-STP}$ is a regenerative co-operative control stop flag. It is set to "1" when termination of regenerative braking is started when antilock brake control is started. After termination has completed, it is reset to "0".

In this process, in a step S1, it is first determined whether or not the flag $F_{ABS}$ is "1". When the flag $F_{ABS}$ is "1", the routine proceeds to a step S2, otherwise it returns to the main program.

In the step S2, it is determined whether or not the flag $F_{ABS-i}$ is "0". When the flag $F_{ABS-i}$ is "0", the routine proceeds to a step S3, otherwise it returns to the main program.

In the step S3, it is determined whether or not the flag $F_{REG-STP}$ is "1." When the flag $F_{REG-STP}$ is "1", the routine proceeds to a step S4, otherwise it returns to the main program.

In the step S4, after performing gradual pressure increase control for the corresponding wheel cylinder $1i$, the routine returns to the main program. Specifically, a gradual pressure increase control counter $CNT_{INC}$ is incremented at a predetermined interval, and when the counter $CNT_{INC}$ is less than a predetermined value $CNT_{INC-0}$, a pressure increase control valve $51i$ (i=FL-RR) and pressure decrease control valve $53i$ (i=FL-RR) are closed and the wheel cylinder pressure is held.

During a brief interval from when the incremented counter $CNT_{INC}$ becomes equal to a predetermined value $CNT_{INC-0}$ to when it becomes greater than a predetermined value $CNT_{INC-1}$ larger than value $CNT_{INC-0}$, the pressure increase control valve $51i$ is opened and the wheel cylinder pressures is increased.

When the counter $CNT_{INC}$ has become greater than the predetermined value $CNT_{INC-1}$, the control counter $CNT_{INC}$ is cleared to "0", and the wheel cylinder pressure is again held.

By repeating this process, the wheel cylinder pressure of the wheel $100i$ for which antilock brake control is not performed, increases for a predetermined period $(=CNT_{INC-1}-CNT_{INC-0})$ at a predetermined interval $(=CNT_{INC-0})$, and the wheel cylinder pressure therefore increases more gradually than the increase of the upstream pressure of the antilock brake control circuit 6 as a result.

In this computing process, when the flag $F_{ABS}$ is "1", the flag $F_{ABS-i}$ is "0" and the flag $F_{REG-STP}$ is "1", that is, antilock brake control is started on another wheel, but when antilock brake control has not started on the corresponding wheel $100i$ and regenerative braking by the motor-generator 103 has stopped, the routine proceeds to the step S4 via the steps S1, S2 and S3 of the computing process of FIG. 5, and the wheel cylinder pressure of the wheel $100i$ is gradually increased.

As mentioned above, when antilock brake control is started on a road surface with very low frictional coefficient p, regenerative braking of the motor-generator 103 cannot be stopped immediately. The upstream pressure of the antilock brake control circuit 6 immediately increases when the pressure increase control valve 51FL-51RR is open and the pressure decrease control valve 53FL-53RR is closed while the regenerative braking force is still acting.

Figure 6:
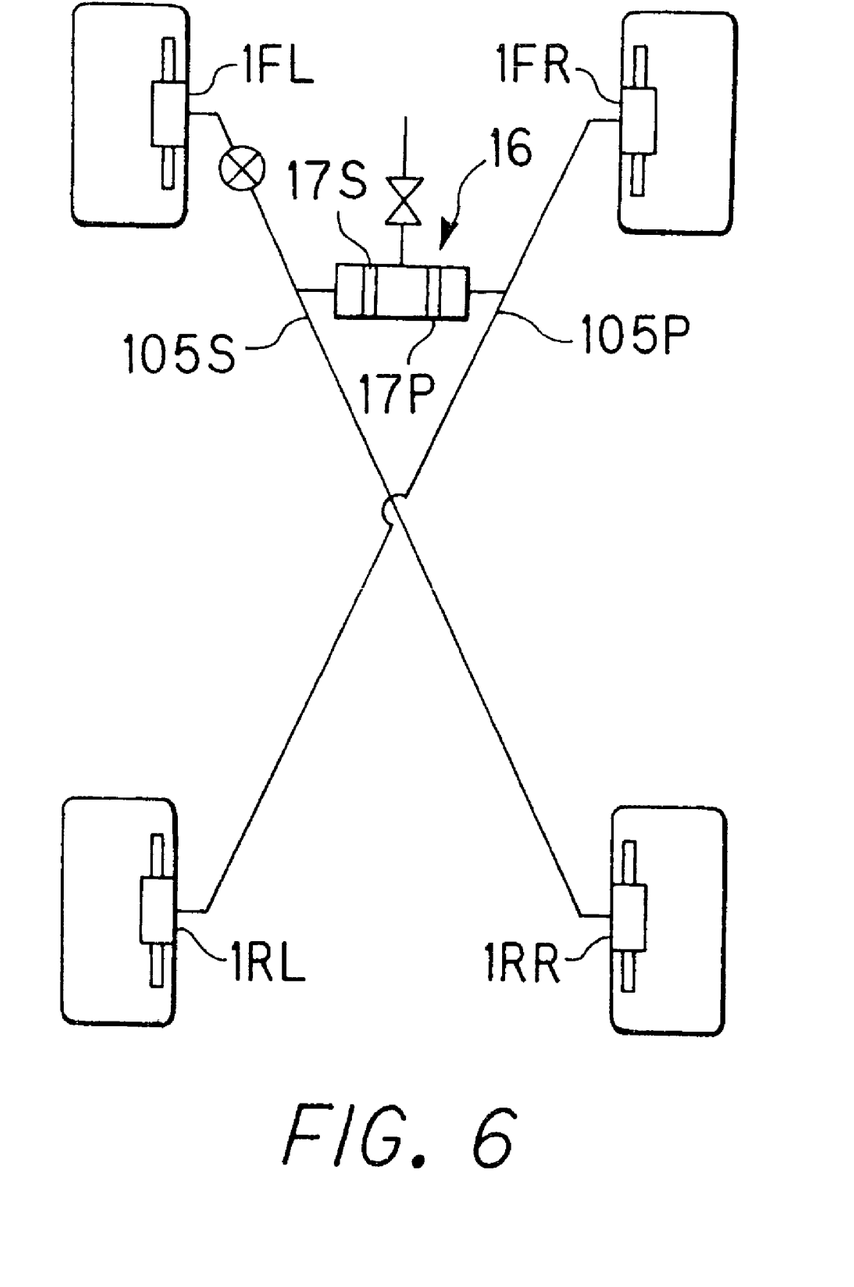
FIG. 6 is a schematic diagram showing the arrangement of a brake line of the vehicle.

In this case, if this invention is not applied, when for example the fluid pressure applied to the front left wheel cylinder 1FL is being held or is decreasing due to antilock brake control, the upstream pressure of the antilock control circuit 6 is not provided to the front left wheel cylinder 1FL, as shown in FIG. 6. Therefore, the fluid pressure acting on the rear right wheel cylinder 1RR connected to the same line 105S will increase to a pressure higher than the master cylinder pressure.

Moreover, if the fluid pressure increases too much upstream of the antilock brake control circuit 6, the piston 17S in the pressure control cylinder 16 is pushed back. Consequently, the input pressure increases and the piston 17P is pushed out. The output pressure also increases to a pressure higher than the master cylinder pressure as a result.

If the fluid pressure becomes higher than the master cylinder pressure, the braking force will become too large. This phenomenon disappears in a short time, but the wheels tend to lock easily and antilock brake control may start early.

On the other hand, by applying this invention, even if regenerative braking of the motor-generator 103 stops slowly when antilock brake control is started, by controlling the pressure increase control valves 51FR, 51RL, 51RR for which antilock brake control has not started, the fluid pressure acting on the wheel cylinders 1FR, 1RL, 1RR for which antilock brake control has not started increases gradually, and an excessive braking force is prevented from acting on the wheels 100FR, 100RL and 100RR.

The above-mentioned embodiment was described for the case where a front wheel pressure decrease control circuit was provided, but this invention may also be applied to a braking force controller without a front wheel pressure decrease control circuit.

The entire contents of Japanese Patent Applications P10-74308 (filed Mar. 23, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed:

1. A braking force controller for a vehicle with wheels, comprising:

a generator which applies an electrical braking force to one of said wheels, hydraulic actuators which respectively apply braking force to all of said wheels, a fluid pressure control circuit which provides a first fluid pressure, a brake control circuit which provides a second pressure based on the first pressure to said actuators, an antilock brake control circuit which provides a third pressure which is lower than the second fluid pressure to an actuator corresponding to a slipping wheel, and a microprocessor programmed to:

control said fluid pressure control circuit to decrease the first fluid pressure when said generator is applying the electrical braking force to said one of said wheels, control said generator to stop application of said electrical braking force to said one of said wheels and control said fluid pressure control circuit to increase the first fluid pressure, when said antilock brake control circuit is providing the third fluid pressure to said actuator corresponding to the slipping wheel, control said brake control circuit to increase the second fluid pressure more gradually than the increase of the first fluid pressure by said fluid pressure control circuit, when said motor generator has stopped application of said electrical braking force to said one of said wheels.

2. A braking force controller according to claim 1, comprising:

a master cylinder and a pressure source which provide a fluid pressure to said fluid pressure control circuit according to the depression of a brake pedal, and lines to which two of said actuators are connected, wherein said fluid pressure control circuit changes over the fluid pressure from said master cylinder and the fluid pressure from said pressure source so as to control the fluid pressure applied to said lines.

3. A braking force controller according to claim 2, wherein said lines comprise a primary line to which an actuator of a front right wheel and an actuator of a rear left wheel are connected, and a secondary line to which an actuator of a front left wheel and an actuator of a rear right wheel are connected, said fluid pressure control circuit is equipped with a control cylinder, said control cylinder comprises two pistons having identical pressure receiving surface areas on an input side and identical pressure receiving surface areas on an output side, and two cylinders housing said pistons, the fluid pressure from said pressure source is applied to the input side of said pistons, and the pressure generated on the output side of said pistons is provided to said lines.

4. A braking force controller according to claim 2, wherein said pressure source is a fluid pressure booster.

5. A braking force controller for a vehicle with wheels, comprising:

a generator which applies an electrical braking force to one of said wheels, hydraulic actuators which respectively apply braking force to all of said wheels, a fluid pressure control circuit which provides a first fluid pressure, a brake control circuit which provides a second pressure based on the first pressure to said actuators, an antilock brake control circuit which provides a third pressure which is lower than the second fluid pressure to an actuator corresponding to a slipping wheel, means for controlling said fluid pressure control circuit to decrease the first fluid pressure when said generator is applying the electrical braking force to said one of said wheels, means for controlling said generator to stop application of said electrical braking force to said one of said wheels and controlling said fluid pressure control circuit to increase the first fluid pressure, when said antilock brake control circuit is providing the third fluid pressure to said actuator corresponding to the slipping wheel, means for controlling said brake control circuit to increase the second fluid pressure more gradually than the increase of the first fluid pressure by said fluid pressure control circuit, when said motor generator has stopped application of said electrical braking force to said one of said wheels.

* * * * *